(12) United States Patent
Bremner

(10) Patent No.: US 11,750,059 B2
(45) Date of Patent: Sep. 5, 2023

(54) END SHIELD WITH SPRAY FEATURE

(71) Applicant: Deere & Company, Moline, IL (US)

(72) Inventor: Ronald D. Bremner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 193 days.

(21) Appl. No.: 16/784,295

(22) Filed: Feb. 7, 2020

(65) Prior Publication Data

US 2021/0249929 A1  Aug. 12, 2021

(51) Int. Cl.
*H02K 5/20* (2006.01)
*H02K 9/19* (2006.01)

(52) U.S. Cl.
CPC ............... *H02K 5/20* (2013.01); *H02K 9/19* (2013.01)

(58) Field of Classification Search
CPC .. H02K 21/24; H02K 9/19; H02K 7/14; H02K 5/04; H02K 5/1735; H02K 5/15; H02K 5/10; H02K 5/02; H02K 5/225; H02K 5/20; H02K 1/12; H02K 1/185; H02K 1/32; H02K 1/2793; H02K 1/20; H02K 1/182; H02K 3/46; H02K 21/12; H02K 7/116

See application file for complete search history.

(56) References Cited

U.S. PATENT DOCUMENTS

| | | | |
|---|---|---|---|
| 8,129,874 B2 | 3/2012 | Lambka et al. | |
| 8,169,110 B2 | 5/2012 | Swales et al. | |
| 8,378,550 B2 * | 2/2013 | Bradfield | H02K 9/00 310/260 |
| 8,786,146 B2 | 7/2014 | Cai et al. | |
| 8,937,414 B2 * | 1/2015 | Song | H02K 9/19 310/410 |
| 8,975,792 B2 | 3/2015 | Chamberlin et al. | |
| 9,397,536 B2 | 7/2016 | Cimatti | |
| 10,615,667 B2 | 4/2020 | Kimoto et al. | |
| 2009/0015084 A1 * | 1/2009 | Kalavsky | H02K 5/128 310/89 |
| 2015/0207386 A1 * | 7/2015 | Garrard | H02K 15/02 310/54 |
| 2015/0276282 A1 * | 10/2015 | Heiden | F04D 25/0606 62/115 |
| 2017/0207683 A1 * | 7/2017 | Anghel | H02K 9/19 |
| 2017/0279329 A1 | 9/2017 | Hanumalagutti et al. | |
| 2019/0006908 A1 * | 1/2019 | Scharlach | H02K 9/193 |

FOREIGN PATENT DOCUMENTS

WO  2005099070 A1  10/2005

OTHER PUBLICATIONS

German Search Report issued in application No. DE102020216595.5, dated Sep. 21, 2021, 5 pages.

* cited by examiner

*Primary Examiner* — Bryan R Perez
(74) *Attorney, Agent, or Firm* — TUCKER ELLIS LLP

(57) ABSTRACT

An end shield for an electric machine is provided. The end shield includes a collar extending between a housing of the electric machine and an end coil. The collar includes one or more spray apertures for directing a fluid onto the end coil.

14 Claims, 12 Drawing Sheets

END SHIELD WITH SPRAY FEATURE

BACKGROUND

Some electric machines (e.g., electric motors, generators, or the like) may be liquid cooled. One common technique for liquid cooling is to spray coolant on end windings of the electric machine. This technique can be achieved with a spray ring. The spray ring may be machined or made of powdered metal and has holes in it to direct coolant onto the end windings. To minimize leakage, the spray rings are manufactured with tight tolerances. Accordingly, conventional liquid cooled electric machines introduce additional components (e.g. spray rings), which may require significant machining to function efficiently.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, an end shield for an electric machine is provided. The end shield includes a cap having an outer ring concentrically coupled to a hub ring via one or more supports extending radially inward from the outer ring to the hub ring. The end shield also includes a collar extending orthogonally away from a back side of the cap, the collar include a plurality of apertures circumferentially spaced around the collar. A diameter of the collar is such that the collar extends between a housing of the electric machine and an end coil of the electric machine when the end shield is mounted to the electric machine. The plurality of apertures direct a fluid onto the end coil for cooling.

In another implementation, a method for cooling end coils of an electrical machine is provided. The method includes delivering a fluid through one or more channels formed on an inner surface of a housing of the electric machine. The method also includes depositing fluid from the one or more channels onto the end coils of the electric machine via a plurality of spray openings. The plurality of spray openings are provided on end shields of the electric machine.

In still another implementation, an electric machine is provided. The electric machine includes a motor assembly including a stator and a rotor, the stator having a pair of end coils positioned at respective ends of the motor assembly in an axially spaced arrangement. The electric machine further includes a housing surrounding the motor assembly. In addition, the electric machine includes a pair of end shields mounted to the housing at respective ends. Each end shield includes an outer ring, a hub ring concentrically arranged within the outer ring and coupled to the outer ring via one or more supports radially extending therebetween, a collar axially extending away from a back of the outer ring, and a plurality of spray openings on the collar to direct fluid onto a respective end coil of the pair of end coils.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference to the accompanying drawings, which are incorporated in and constitute a part of the specification.

DETAILED DESCRIPTION

Figure 1:
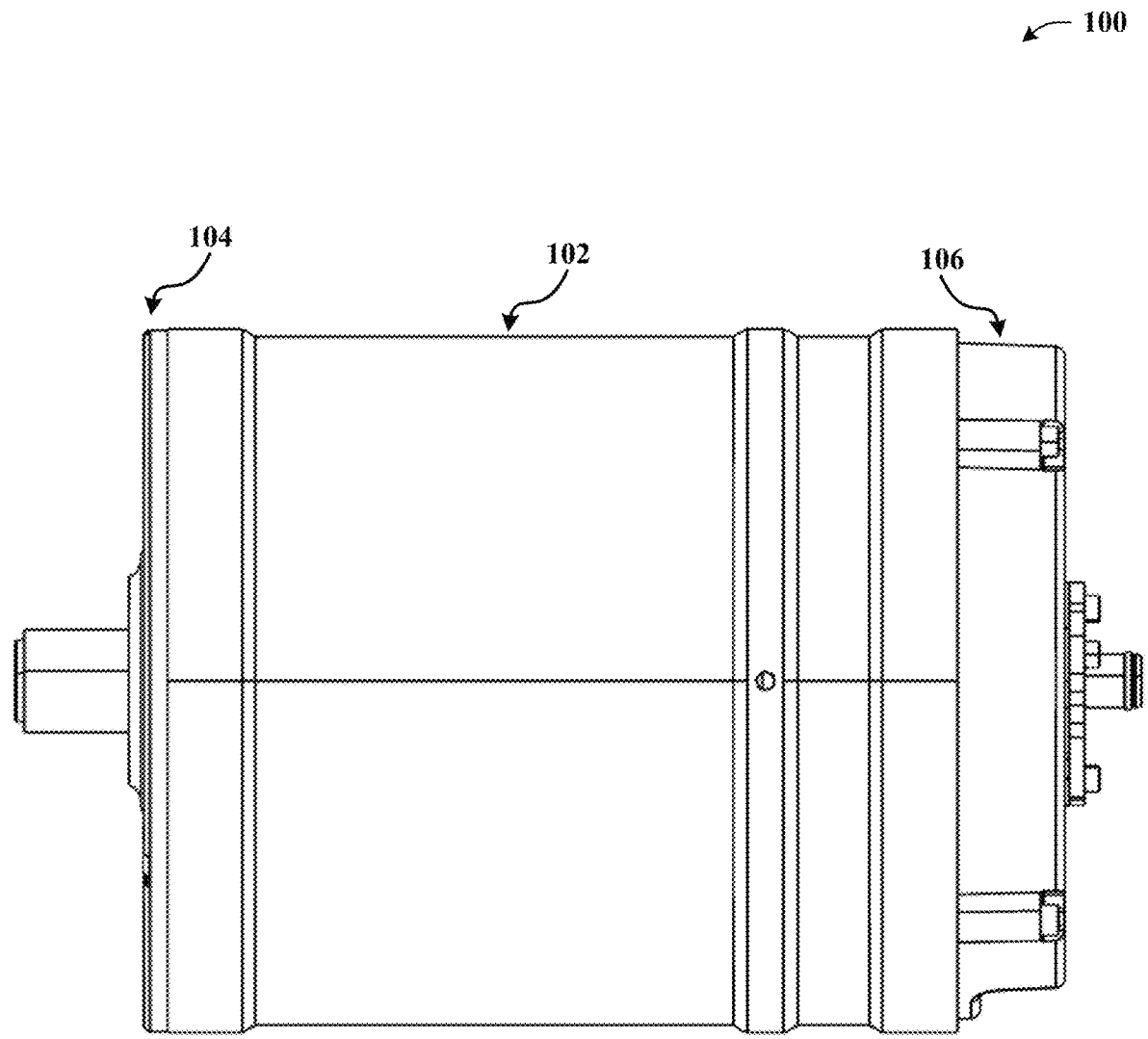
FIG. 1 illustrates an exemplary, non-limiting embodiment of an electric machine according to various aspects.

As described above, typical liquid cooled electric machines may sometimes include additional components—namely, spray rings—to spray coolant onto end windings. Such spray rings often have tight dimensional tolerances on an outer diameter to retain the rings in the assembly and to minimize fluid leakage. Thus, spray rings increase component costs of electric machines. Further, spray rings also increase production costs. For instance, spray rings may often be installed by dropping the rings into a hot housing or may have a force-fit. Moreover, typical spray rings are generally circular without an orientation such that the ring and spray pattern is symmetrical. If a non-symmetrical spray pattern is desired, additional steps and efforts are needed in a production process to maintain alignment.

In accordance with various embodiments, an end shield of an electric machine is provided with a plurality of spray openings to direct a fluid onto an end coil or end winding. As a spray feature is provided on the end shield, additional process steps such as incorporating a spray ring into a hot housing are eliminated. Spray channels provided on the end shield may be orthogonal to an axis of the electric machine. It is to be appreciated, however, that alternative angles and/or directions for the channels are possible. Moreover, end shields typically have an orientation. For example, end shields may be configured to mount to an electric machine in a particular orientation or a limited set of orientations. Thus, since the end shield can be easily aligned with the electric machine in a particular orientation in a repeatable fashion, different spray patterns (e.g. orientation of the channels) can be utilized to direct fluid to particular portions of the end coil. In yet another advantage with end shields provided with a spray feature, the spray pattern may be readily changed by swapping the end shield, which, in some embodiments, may be bolted to the electric machine. Spray rings, in contrast, cannot be swapped in this manner as they are shrink fit and cannot be removed without being damaged.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, an electric machine 100 is illustrated. The electric machine 100 includes a housing 102 surrounding an internal assembly of the electric machine. For instance, in some embodiments, the internal assembly includes a stator and a rotor. The housing 102 may be generally cylindrical as shown in the figures, but it is to be appreciated that other configurations may be employed with the aspects disclosed herein. Disposed at opposite ends of the housing 102 are a first end shield 104 and a second end shield 106. The end shields 104 and 106 may be affixed to the housing 102 via bolts or other fastening means to secure the internal assembly.

Figure 2:
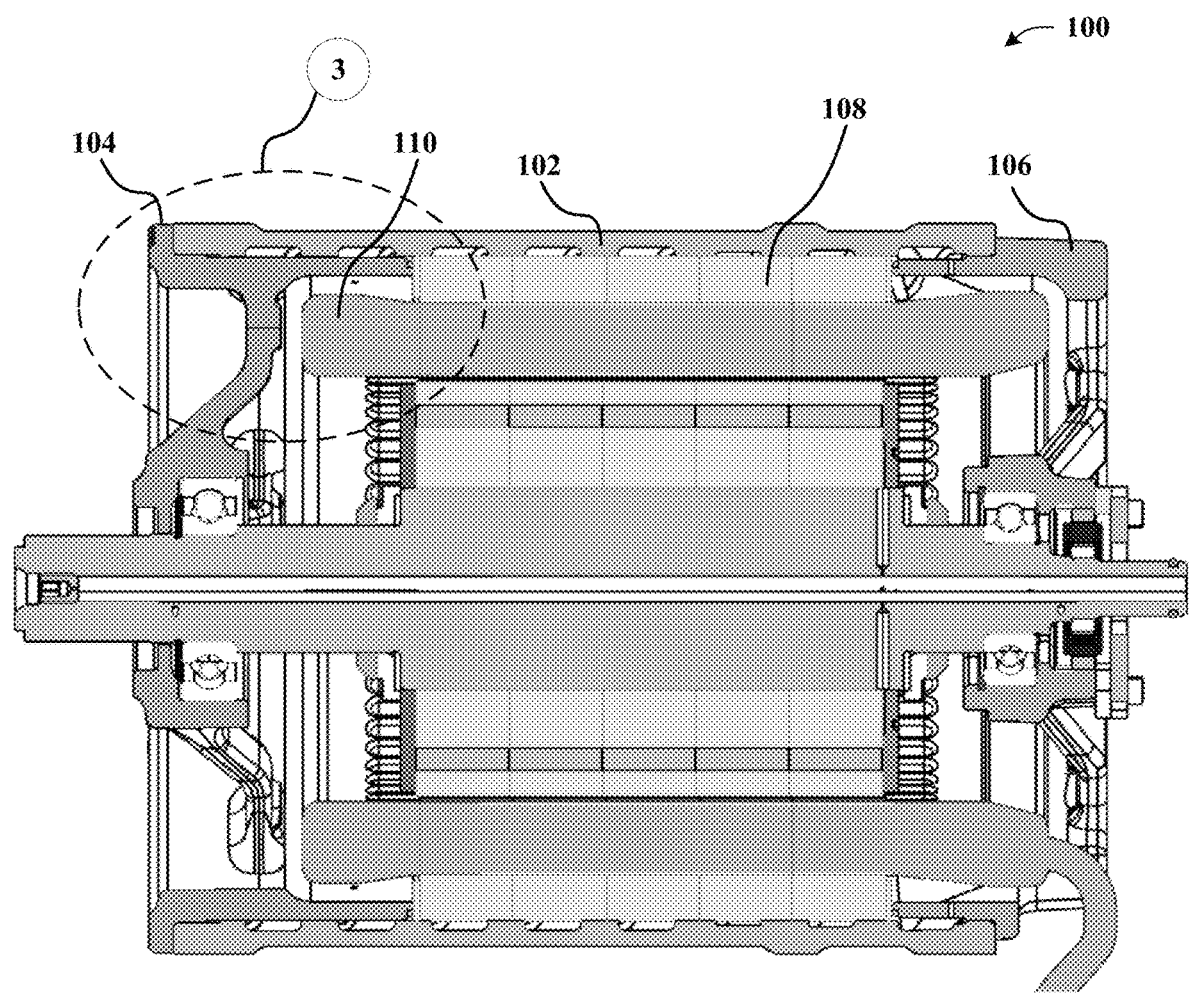
FIG. 2 illustrates a cross-sectional view of an exemplary, non-limiting embodiment of an electric machine in accordance with an aspect.

Turning now to FIG. 2, illustrated is a cross-sectional view of electric machine 100 according to an embodiment. In the FIG. 2, the cross-section is along an axis of the electric machine 100. As mentioned above, the electric machine 100 includes a stator 108 and end windings or end coils 110. In an embodiment, the end shields 104 and 106 extend into housing 102. Particularly, end shields 104 and 106, in an embodiment, are positioned against stator 108 and arranged between housing 102 and the end coils 110.

Figure 3:
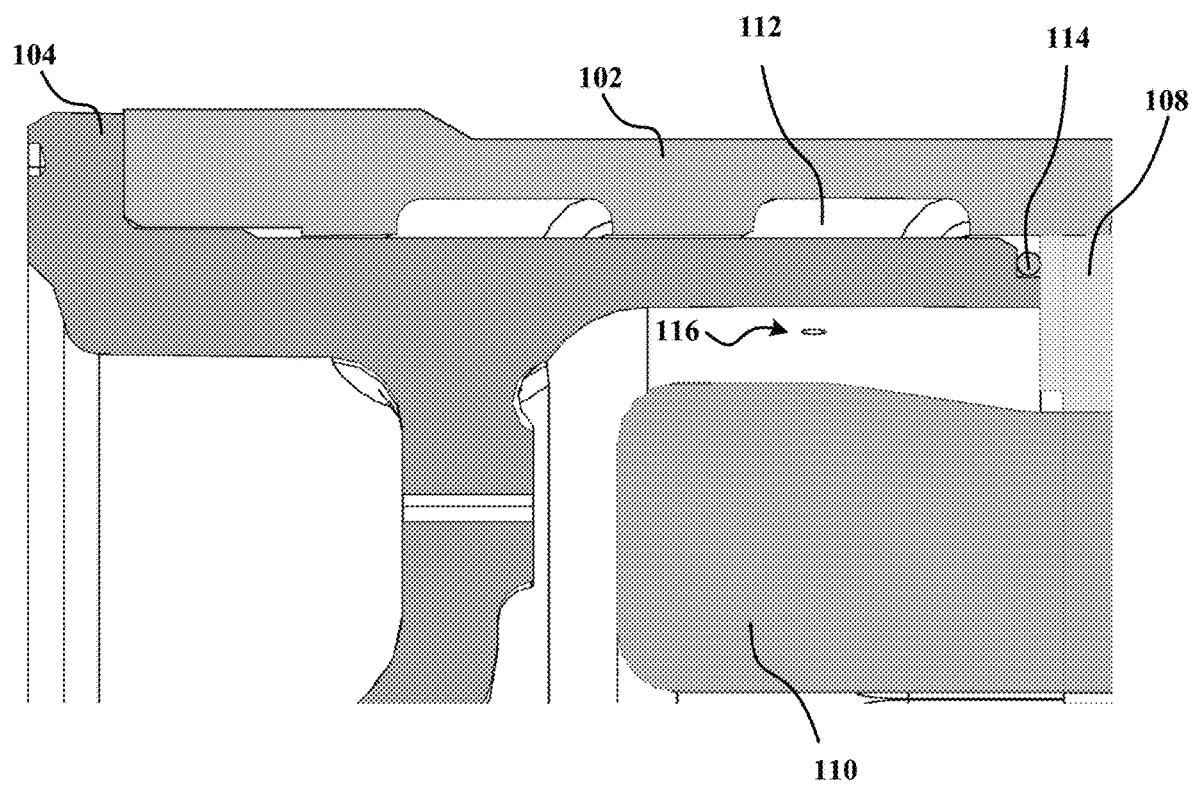
FIG. 3 illustrates an enlarged view of a portion of FIG. 2.

Referring to FIG. 3, an enlarged view of region 3 of FIG. 2 is depicted. The first end shield 104 extends into housing 102 of electric machine 100 and abuts stator 108. Thus, end shield 104 (and end shield 106) may be simply coupled to housing 102, without a shrink fit process as with traditional spray rings.

In an embodiment, a sealing ring 114 can be positioned at least partially between the end shield 104 and stator 108. Sealing ring 114, in an embodiment, may be an O-ring. Although not shown in FIG. 3, it is to be appreciated that additional sealing means may be employed between end shield 104 and housing 102. Such seals may be positioned near an outer end of housing 102 (e.g. left side of FIG. 3) and/or around channel 112.

According to an aspect, channel 112 are provided on an inner surface of housing 102. Channel 112 may circulate a fluid (e.g. a liquid coolant) through the electric machine 100. In one embodiment, there may be a single channel 112 running along the inner surface of housing 102 in, for example, a helical pattern.

With conventional liquid cooled electric machines, channel 112 may deliver fluid to a spray ring. Without spray rings, according to an embodiment, channel 112 may deliver fluid to a plurality of apertures 116 (also referred to herein as spray openings 116), which are disposed on end shield 104. The end shield 104 is positioned between housing 102 and end coil 110 so that spray openings 116 align with channel 112. The spray openings 116 open to spray channels extending through end shield 104 to allow fluid to flow from channel 112 and onto end coil 110.

Figure 4:
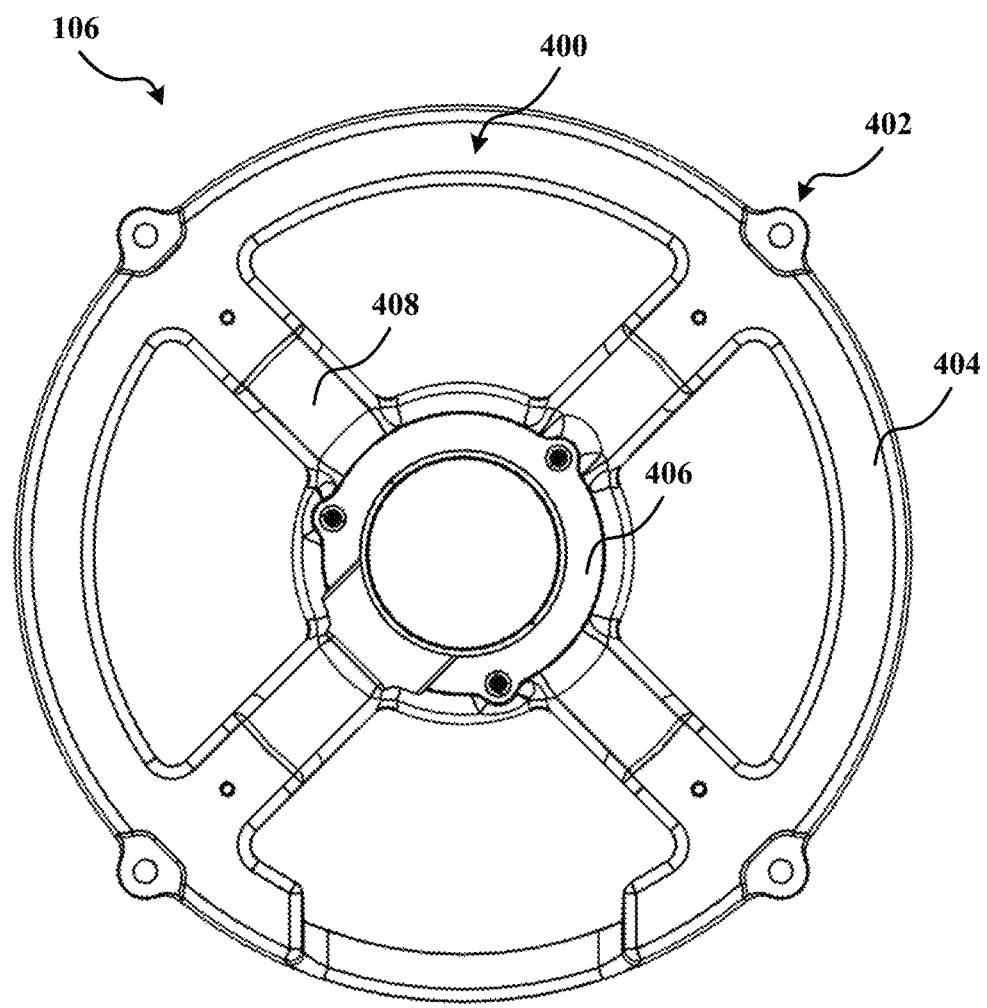
FIG. 4 illustrates a front view of an exemplary, non-limiting embodiment of an end shield in accordance with an aspect.
Figure 5:
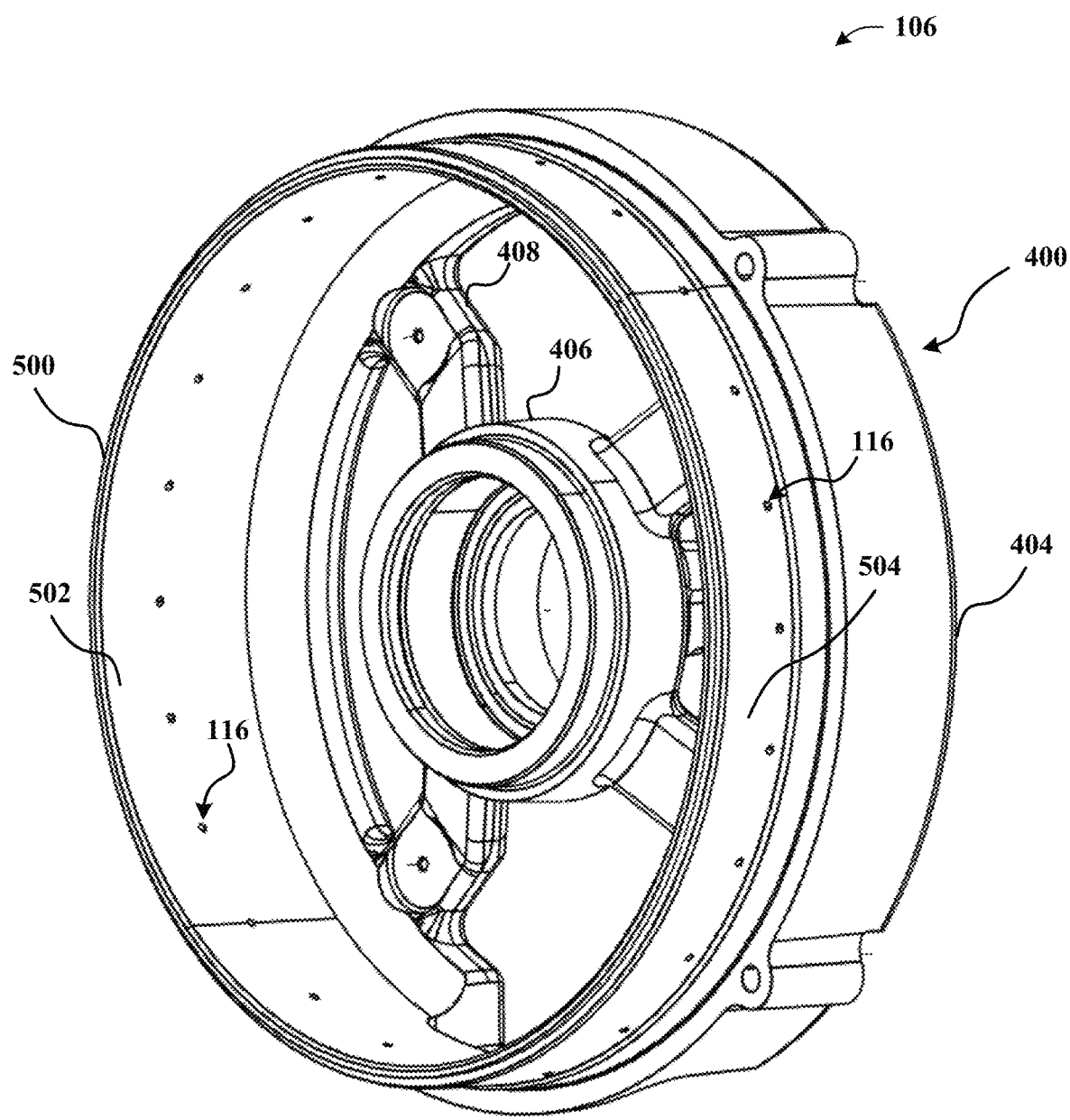
FIG. 5 illustrates a rear, perspective view of an exemplary, non-limiting embodiment of the end shield of FIG. 4.
Figure 6:
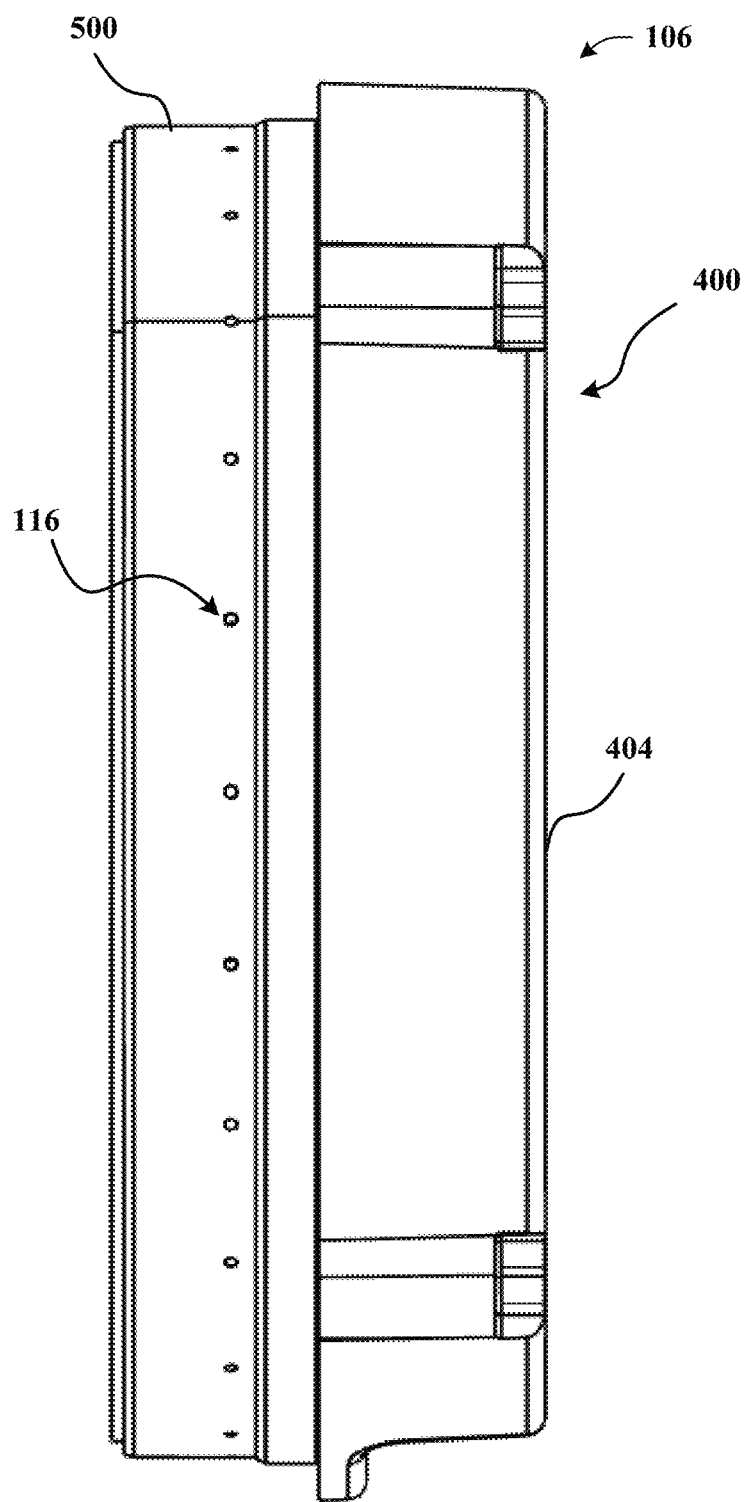
FIG. 6 illustrates a side profile view of an exemplary, non-limiting embodiment of the end shield of FIGS. 4 and 5.
Figure 7:
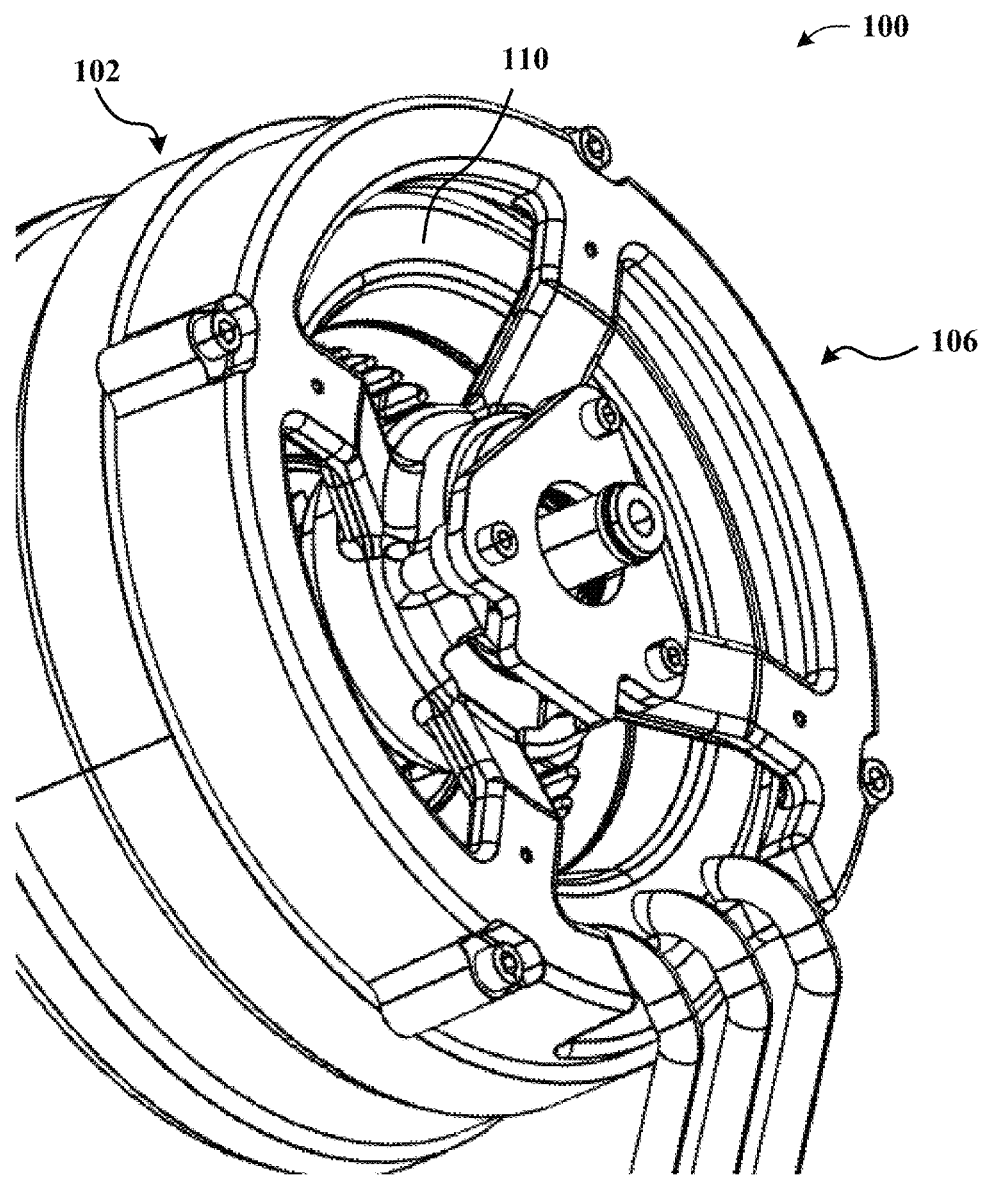
FIG. 7 illustrates a front perspective view of an exemplary, non-limiting embodiment of the end shield of FIGS. 4-6 mounted to an electric machine.

Turning now to FIGS. 4-7, which illustrate an exemplary embodiment of end shield 106 according to various aspects. FIGS. 4-6 depict end shield 106 isolated, while FIG. 7 illustrates end shield 106 mounted to housing 102 of electric machine 100.

End shield 106 is substantially circular in an embodiment. It is to be appreciated, however, that other configurations for end shield 106 are contemplated. For instance, end shield 106 may correspond in shape and size to housing 102 of electric machine 100 to which the shield is mounted.

As shown in FIGS. 4-6, end shield 106 includes a cap 400, which is configured to provide an outer surface of end shield 106 when mounted to electric machine 100 via bolts inserted through mounting openings 402, for example. The cap 400 of end shield 106 includes an outer ring 404 and a hub ring 406. Outer ring 404, in an embodiment, secures the end shield 106 to housing 102 of electric machine 100. Hub ring 406 supports at least a portion of the electric machine 100. For instance, the hub ring 406 may house a bearing for a rotor of electric machine 100. Outer ring 404 and hub ring 406 are concentrically arranged and coupled via one or more spokes or supports 408 generally extending radially between the outer ring 404 and the hub ring 406.

As best shown in FIGS. 5 and 6, end shield 106 includes a collar 500 extending orthogonally from a back side of cap 400. The collar 500 has a length in a direction parallel to an axis of electric machine 100. Collar 500 is annular and has an inner surface 502 and an outer surface 504. The plurality of spray openings 116 are disposed on collar 500 in a circumferential arrangement. Each spray opening 116 provides a spray channel from the outer surface 504 to the inner surface 502. The spray openings 116 direct fluid delivered to the outer surface 504 into the interior of the annular collar 500. When shield 106 is coupled to electric machine 100, collar 500 extends between housing 102 and end coil 110. End coil 110 is positioned near inner surface 502 in proximity to spray openings 116. Accordingly, fluid delivered to outer surface 504 is directed onto end coil 110.

Figure 8:
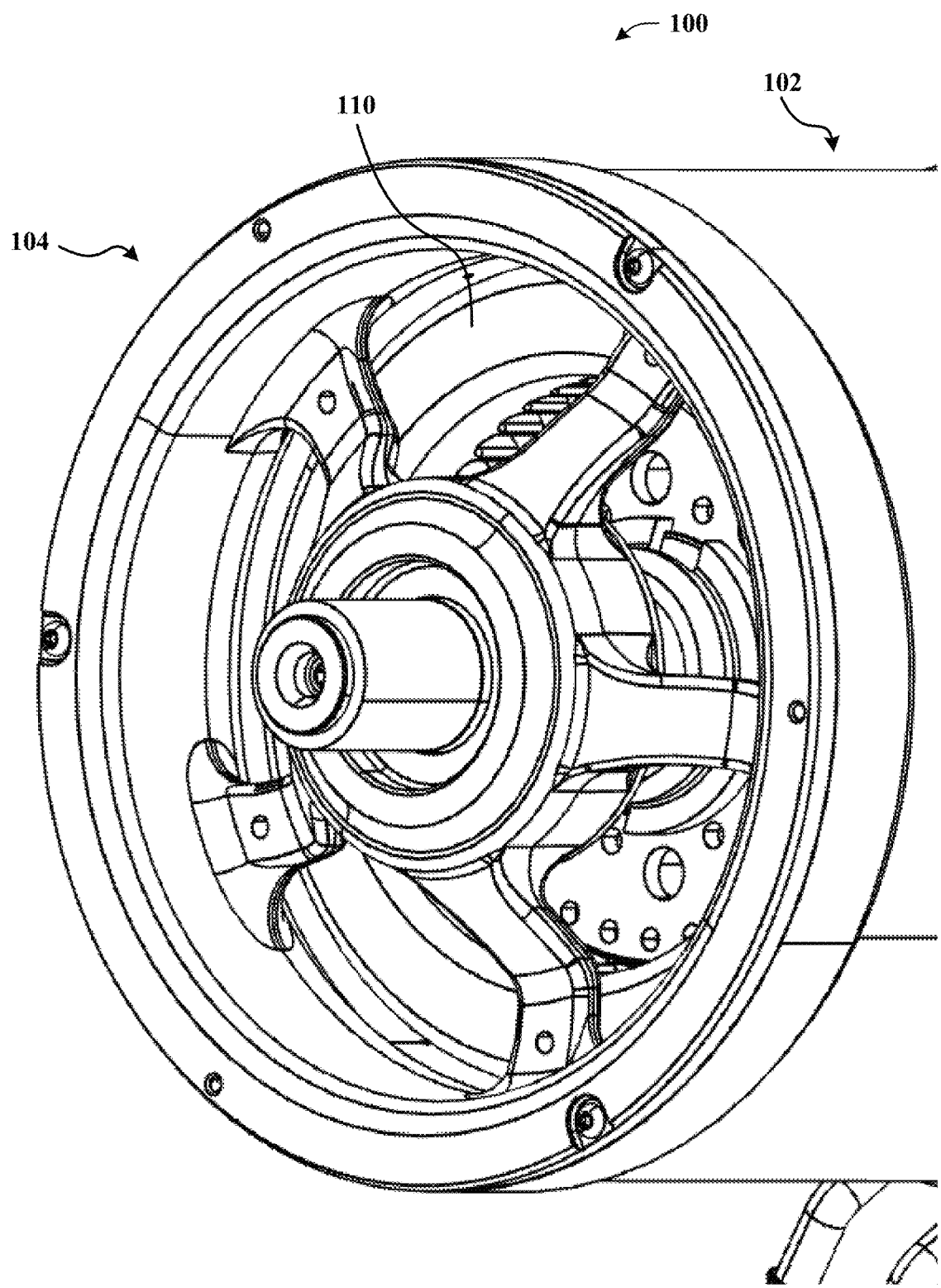
FIG. 8 illustrates a front perspective view of an exemplary, non-limiting embodiment of an end shield mounted on an electric machine according to various aspects.
Figure 9:
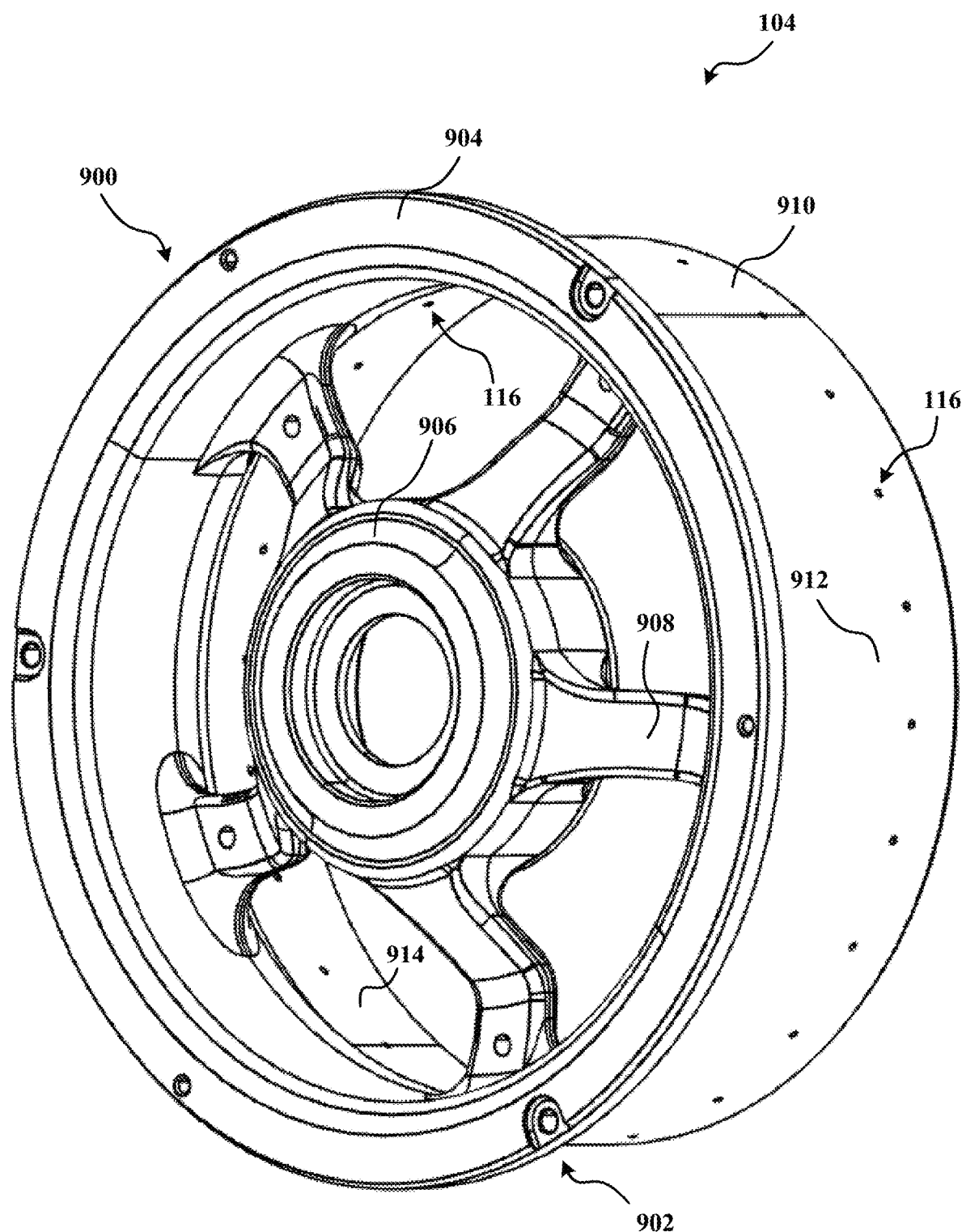
FIG. 9 illustrates a front perspective view of an exemplary, non-limiting embodiment of the end shield shown in FIG. 8.
Figure 10:
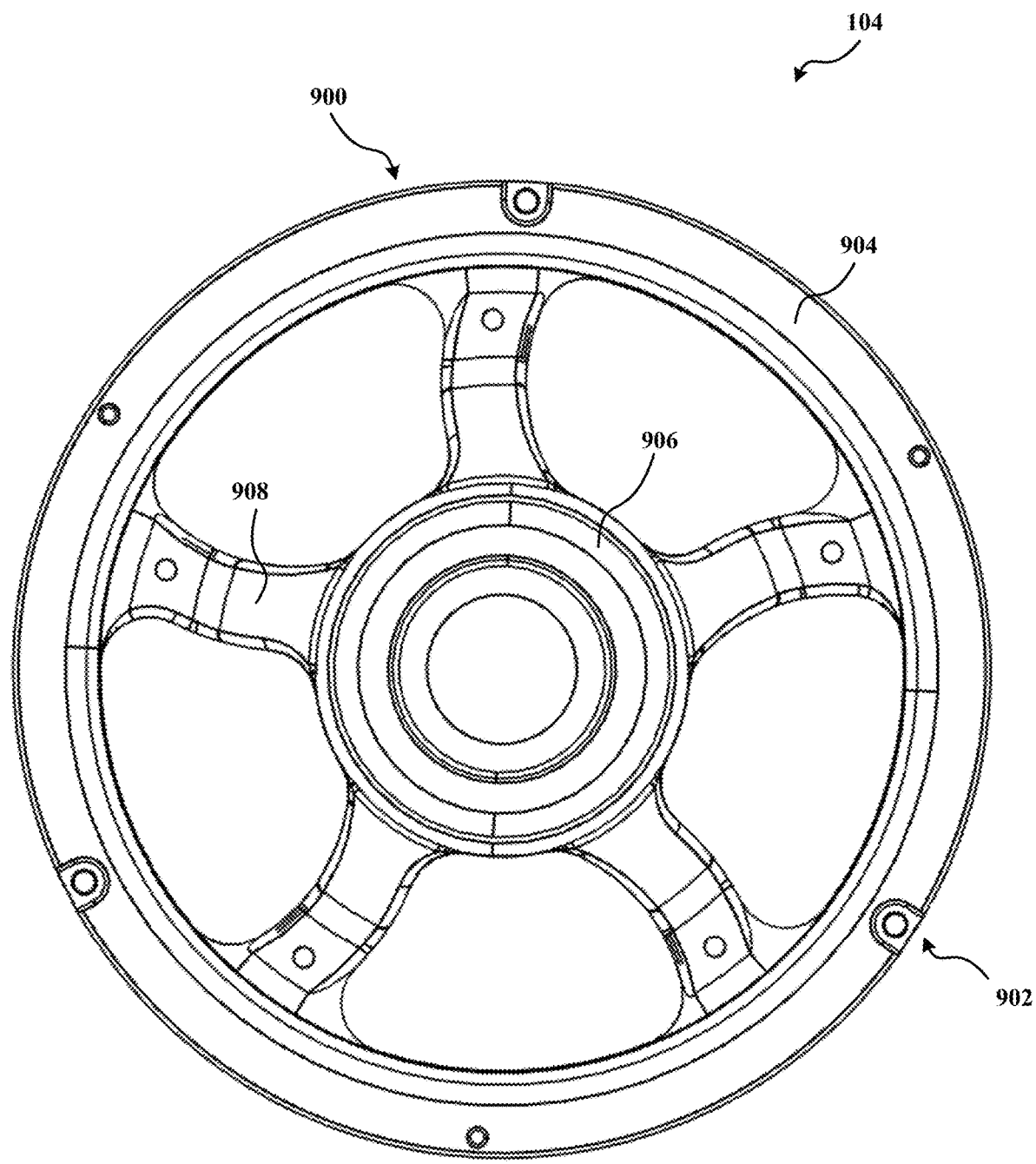
FIG. 10 illustrates a front view of an exemplary, non-limiting embodiment of the end shield of FIGS. 8 and 9.
Figure 11:
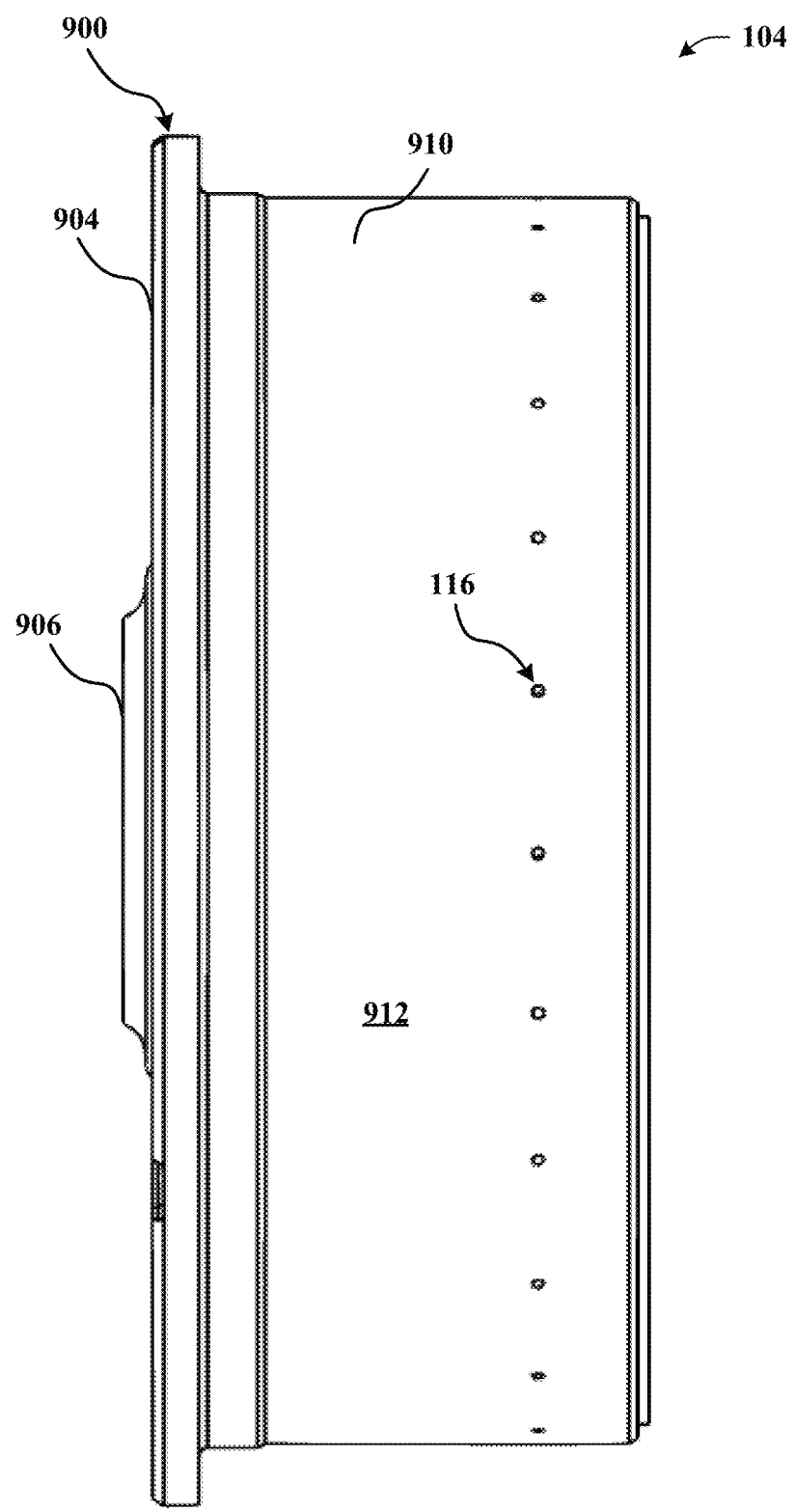
FIG. 11 illustrates a side profile view of an exemplary, non-limiting embodiment of the end shield of FIGS. 8-10.

Referring now to FIGS. 8-11, an exemplary embodiment of end shield 104 is illustrated according to various aspects. In particularly, FIG. 8 depicts end shield 104 mounted to electric machine 100 and FIGS. 9-11 illustrate end shield 104 in isolation. Similar to end shield 106, end shield 104 includes a cap portion 900 that includes an outer ring 904 concentrically arranged with respect to a hub ring 906. The outer ring 904 and hub ring 906 are coupled via one or more supports 908 extending therebetween. The end shield 104 may be coupled to electric machine 100 with bolts inserted through mounting openings 902 or other fastening means.

End shield 104 includes an annular collar 910 extending axially from a back of cap portion 900. The collar 910 has a plurality of apertures 116 arranged around a circumference of collar 910. Each aperture 116 extends from an outer surface 912 to an inner surface 914 of collar 910. A fluid (e.g. coolant) may be delivered to the outer surface 912 of collar 910, for example, by channel 112 of housing 102. The fluid is directed into an interior of collar 910 and onto end coil 110 by the plurality of apertures 116.

Figure 12:
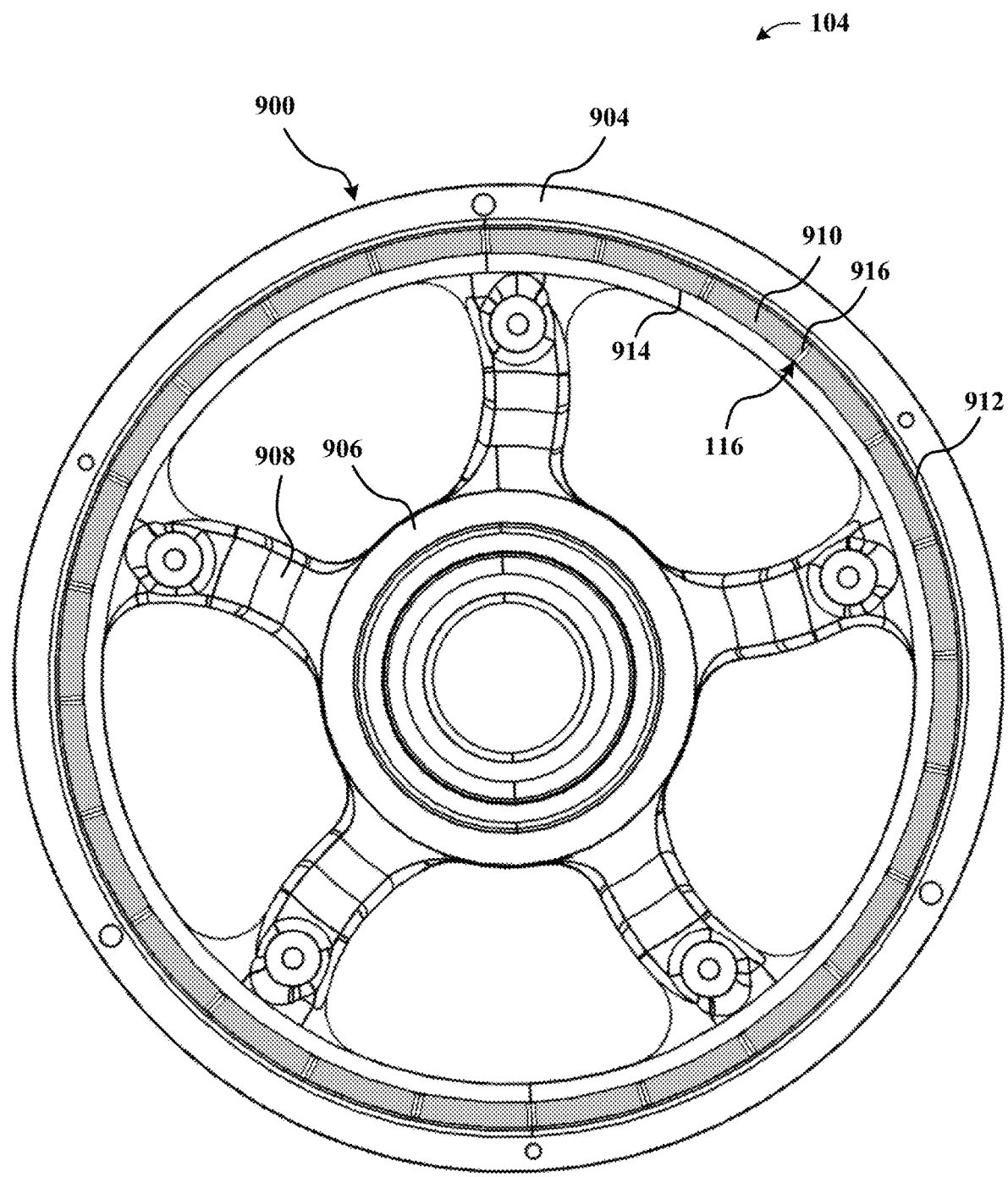
FIG. 12 illustrates bisected view of an exemplary, non-limiting embodiment of an end shield in accordance with an aspect.

Turning to FIG. 12, a bisected view of end shield 104 is illustrated that depicts spray channels 916 extending between outer surface 912 and inner surface 914 of collar 910. Spray channels 916 correspond to the plurality of apertures or spray openings 116. In an embodiment, channels 916 may extend orthogonally to an axis of electric machine 100 as shown in FIG. 12. It is to be appreciated that channels 916 may be arranged at an angle with respect to a radius of end shield 104.

Moreover, while the channels 916 and corresponding openings 116 are arranged uniformly (e.g. at regular intervals) in the embodiment illustrated in the figures, it is to be appreciated that non-uniform configurations are contemplated. For instance, channels 916 (openings 116) may be added to end shield 104 so as to direct more fluid to particular areas of end coil 110.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An end shield for an electric machine, comprising:
    a cap having an outer ring concentrically coupled to a hub ring via one or more supports extending radially inward from the outer ring to the hub ring; and
    a collar extending orthogonally away from a back side of the cap, the collar including a plurality of apertures circumferentially spaced around the collar,
    wherein a diameter of the collar is such that the collar extends between a housing of the electric machine and an end coil of the electric machine when the end shield is mounted to the electric machine, and
    wherein the plurality of apertures align with a channel forming a helical path on an interior surface of the housing to circulate a fluid and the plurality of apertures direct the fluid onto the end coil for cooling delivered via the channel.

2. The end shield of claim 1, wherein the plurality of apertures provide spray channels that extend through the collar from an outer collar surface to an inner collar surface.

3. The end shield of claim 2, wherein the spray channels extend orthogonally to an axis of the electric machine.

4. The end shield of claim 1, wherein the collar has a length, along an axis of the electric machine, so that the end shield abuts a stator of the electric machine when mounted.

5. The end shield of claim 1, further comprising a sealing ring to form a seal between the collar, the stator, and the housing of the electric machine.

6. The end shield of claim 1, wherein the cap further includes mounting openings to facilitate attachment of the end shield to the electric machine via fastening means, wherein the mounting openings are disposed on the outer ring.

7. The end shield of claim 1, wherein the hub ring supports at least a portion of the electric machine axially extending there through.

8. The end shield of claim 1, wherein the cap and collar are integrally formed as a monolithic piece.

9. An electric machine, comprising:
    a motor assembly including a stator and a rotor, the stator having a pair of end coils positioned at respective ends of the motor assembly in an axially spaced arrangement;
    a housing surrounding the motor assembly; and
    a pair of end shields mounted to the housing at respective ends, wherein each end shield comprises:
    an outer ring;
    a hub ring concentrically arranged within the outer ring and coupled to the outer ring via one or more supports radially extending therebetween;
    a collar axially extending away from a back of the outer ring; and
    a plurality of spray openings on the collar to direct fluid onto a respective end coil of the pair of end coils, wherein the plurality of spray openings are aligned and provide respective spray channels that extend through the collar radially and orthogonally with respect to an axis of the electric machine.

10. The electric machine of claim 9, wherein the housing includes a channel on an interior surface to circulate the fluid.

11. The electric machine of claim 10, wherein the channel follows a helical path along the interior surface of the housing.

12. The electric machine of claim 9, further comprising an O-ring to sealingly engage between the collar and one of the housing or the stator.

13. The electric machine of claim 9, wherein the collar extends axially between the housing and the respective end coil and aligns the plurality of spray openings with the channel on the housing.

14. The electric machine of claim 9, wherein the outer ring, the hub ring, the one or more supports, and the collar are integrally formed as a monolithic piece.

\* \* \* \* \*